(12) United States Patent
Sovel

(10) Patent No.: US 10,752,065 B1
(45) Date of Patent: Aug. 25, 2020

(54) CLEARANCE-MEASURING BREAK-AWAY PINTLE HITCH

(71) Applicant: United States of America as Represented by the Secretary of the Navy, Arlington, VA (US)

(72) Inventor: James Sovel, Panama City, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 308 days.

(21) Appl. No.: 15/956,276

(22) Filed: Apr. 18, 2018

(51) Int. Cl.
| | | |
|---|---|---|
| *B60D 1/02* | (2006.01) | |
| *B60D 1/34* | (2006.01) | |
| *B60D 1/44* | (2006.01) | |
| *B60D 1/28* | (2006.01) | |
| *B60D 1/04* | (2006.01) | |

(52) U.S. Cl.
CPC ............ *B60D 1/02* (2013.01); *B60D 1/28* (2013.01); *B60D 1/34* (2013.01); *B60D 1/44* (2013.01); *B60D 1/04* (2013.01)

(58) Field of Classification Search
CPC ... B60D 1/02; B60D 1/04; B60D 1/28; B60D 1/44
See application file for complete search history.

(56) References Cited

U.S. PATENT DOCUMENTS

| | | | | |
|---|---|---|---|---|
| 1,490,758 | A * | 4/1924 | Benson | B60D 1/44 280/496 |
| 1,491,637 | A * | 4/1924 | Schrum | B60D 1/04 280/474 |
| 1,853,163 | A * | 4/1932 | Chase | B60D 1/04 280/510 |
| 2008/0179901 | A1* | 7/2008 | Maus | G08G 1/09 293/132 |
| 2015/0217610 | A1* | 8/2015 | Olson | B60D 1/28 280/507 |
| 2016/0144679 | A1* | 5/2016 | Olson | B60D 1/04 280/507 |

\* cited by examiner

*Primary Examiner* — Jacob D Knutson
*Assistant Examiner* — Conan D Duda
(74) *Attorney, Agent, or Firm* — James T. Shepherd

(57) ABSTRACT

A clearance-measuring break-away pintle hitch includes a mount having a first end for coupling to a vehicle. A pintle body has a portion thereof aligned with and coupled to a second end of the mount by a shear pin. Gauge members are pivotally coupled along a common axis of rotation to the pintle body. Each gauge member is rigid and has a unique length measured from the common axis of rotation. Each gauge member is independently rotatable about the common axis of rotation.

15 Claims, 4 Drawing Sheets

CLEARANCE-MEASURING BREAK-AWAY PINTLE HITCH

STATEMENT OF GOVERNMENT INTEREST

The invention described herein may be manufactured and used by or for the Government of the United States of America for Governmental purposes without payment of any royalties thereon or therefor.

FIELD OF THE INVENTION

The invention relates generally to tow hitches, and more particularly to a break-away pintle hitch having a clearance-measuring device coupled thereto.

BACKGROUND OF THE INVENTION

Many vehicles include a hitch used for towing. Typically, a towing hitch protrudes from a lower region of a vehicle's aft end. When such a vehicle must be deployed on land or in water from a ramp (e.g., as is the case with amphibious assault vehicles), the towing hitch is often the limiting protrusion that strikes the ramp if the ramp angle is too steep. Unfortunately, ramp angles can be difficult to control in amphibious deployments. As a result, towing hitches are subject to deployment damage that can simultaneously cause a water-breech in the vehicle at the hitch's point of attachment. Thus, knowledge of a ramp angle threshold where such damage could occur is critical information for deployment personnel.

SUMMARY OF THE INVENTION

Accordingly, it is an object of the present invention to provide a hitch that can provide clearance measurement information when the hitch is attached to a vehicle that traverses a ramp.

Other objects and advantages of the present invention will become more obvious hereinafter in the specification and drawings.

In accordance with the present invention, a clearance-measuring break-away pintle hitch includes a mount having a first end adapted to be coupled to a vehicle. A pintle body has a portion thereof aligned with a second end of the mount. A shear pin couples the portion of the pintle body to the second end of the mount. The shear pin breaks when the pintle body is subjected to a predefined amount of force such that the pintle body is then uncoupled from the second end of the mount. Gauge members are pivotally coupled along a common axis of rotation to the pintle body. Each gauge member is rigid and has a unique length measured from the common axis of rotation. Each gauge member is independently rotatable about the common axis of rotation.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
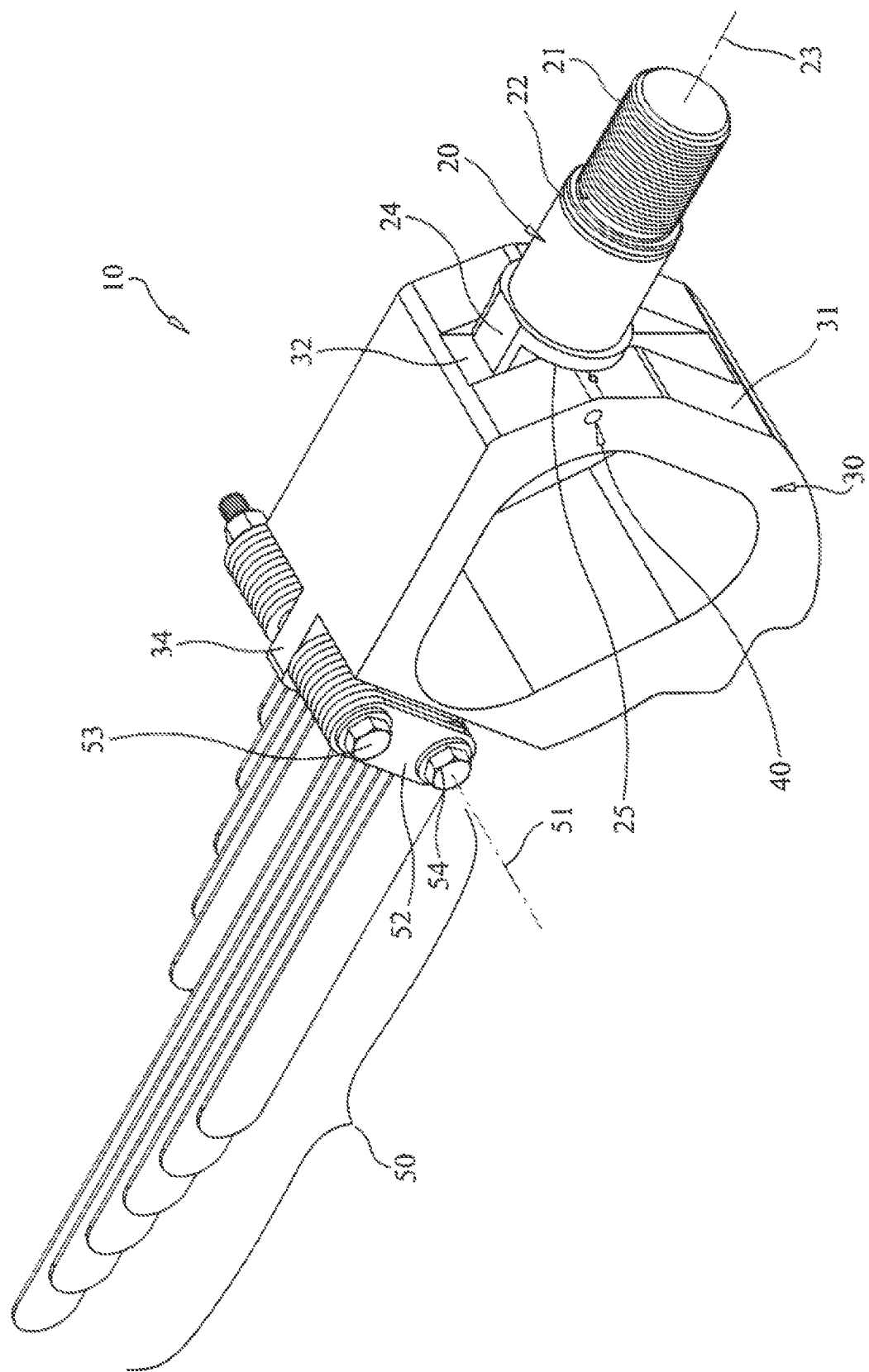
FIG. 1 is a perspective view of a clearance-measuring break-away pintle hitch in accordance with an embodiment of the present invention.
Figure 2:
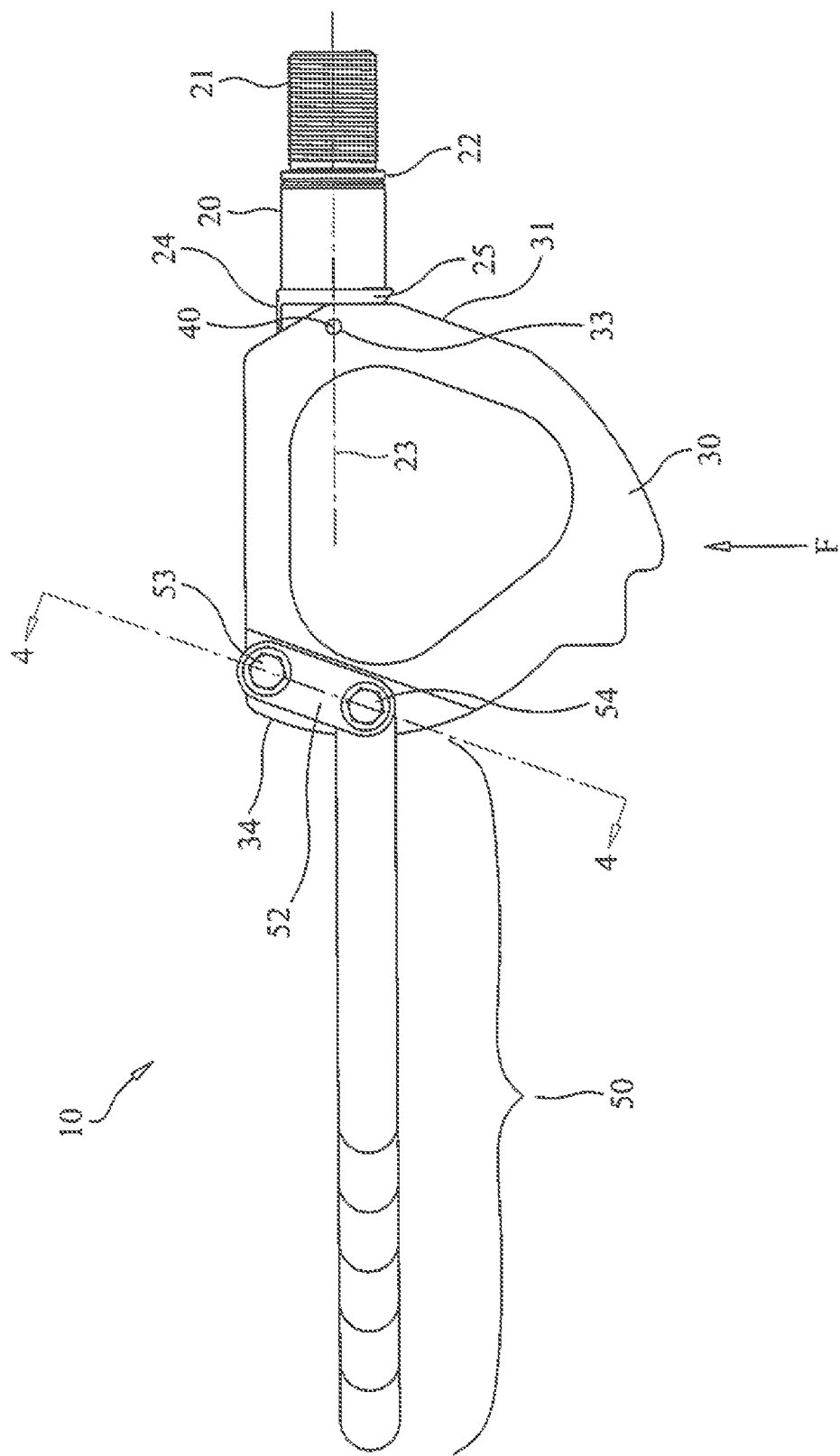
FIG. 2 is a side view of the pintle hitch.
Figure 3:
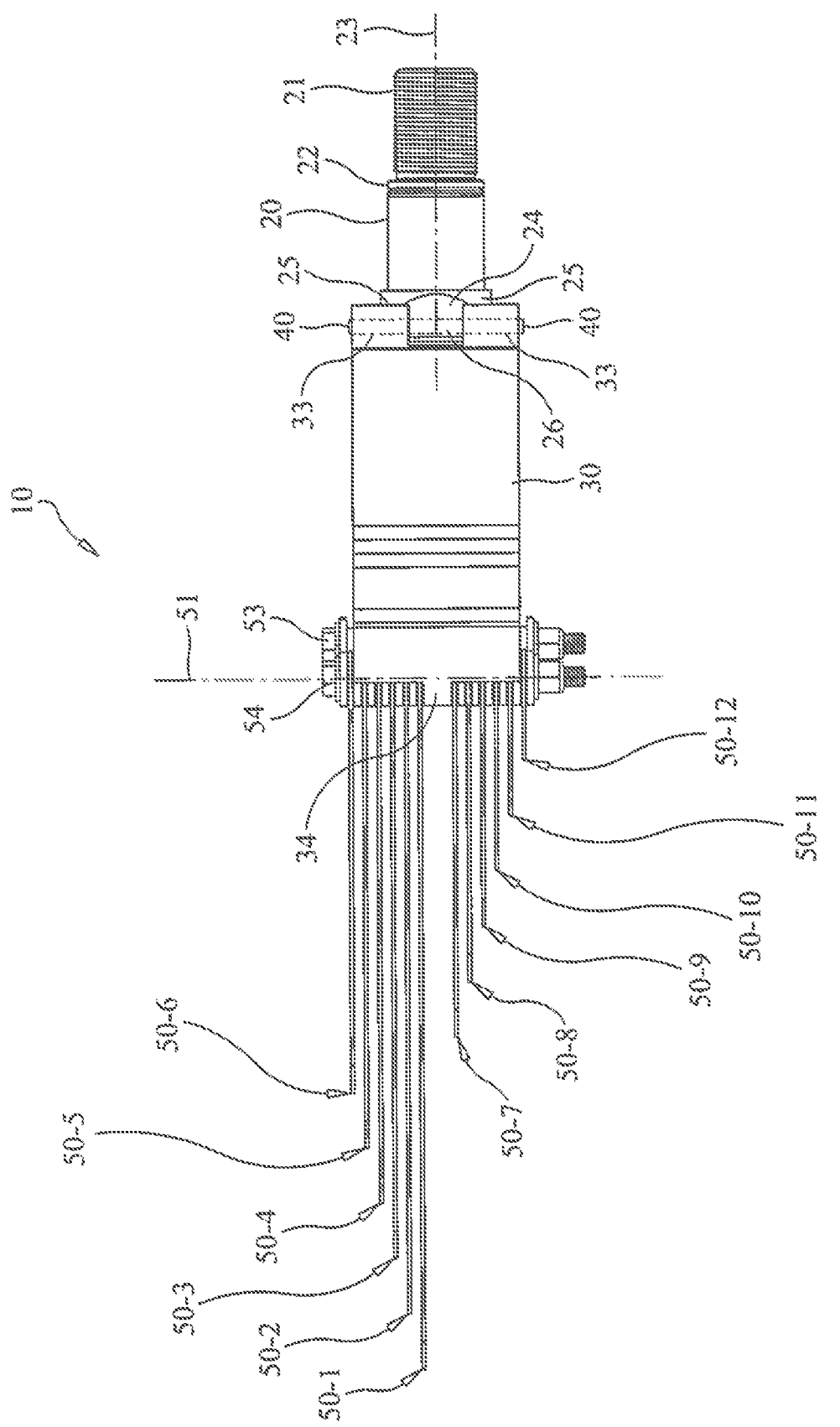
FIG. 3 is a bottom plan view of the pintle hitch.
Figure 4:
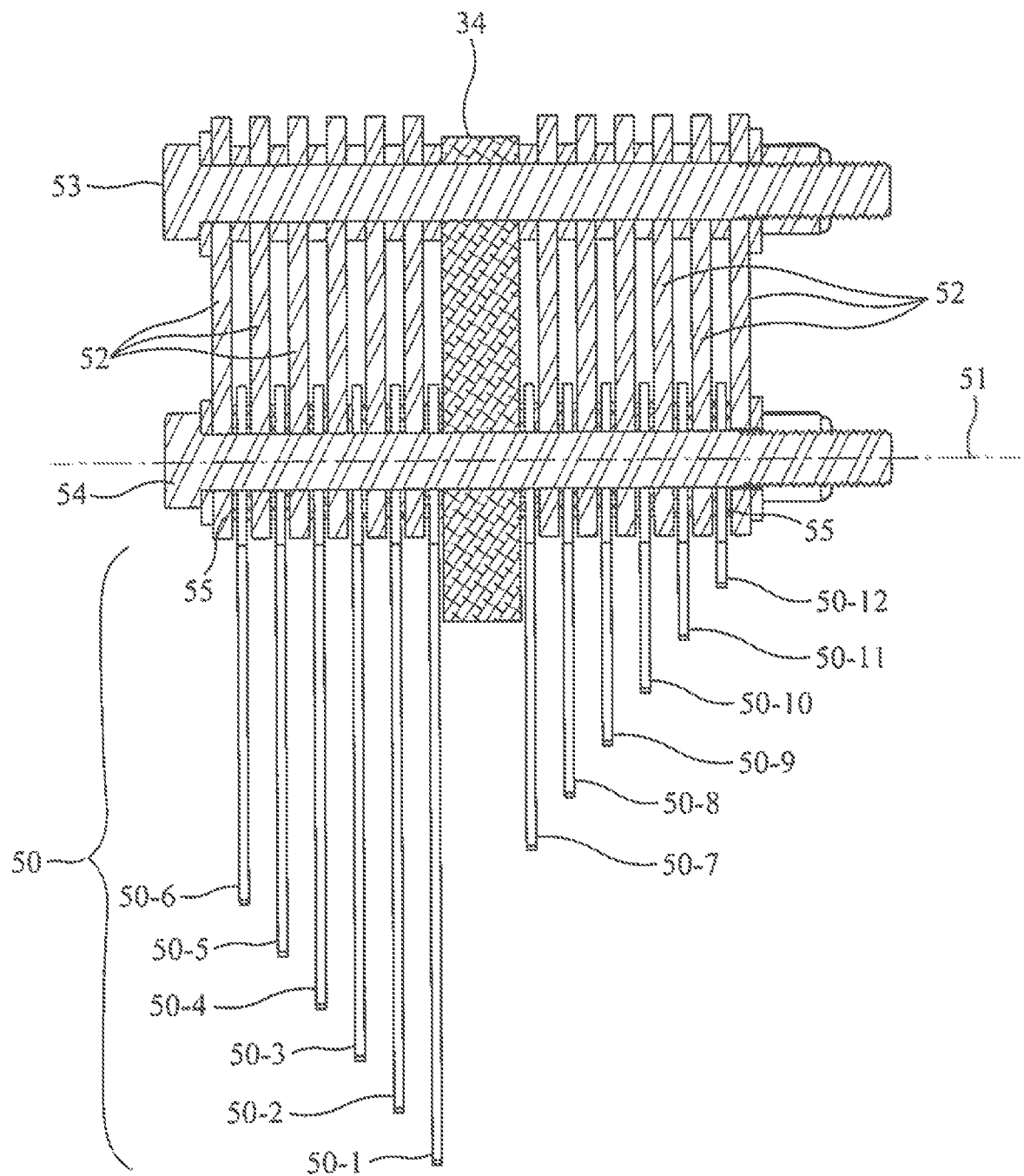
FIG. 4 is a cross-sectional view of the pintle hitch taken along line 4-4 in FIG. 2 illustrating the relationship between the gauge members and mounting plates in accordance with an embodiment of the present invention.

Referring now to the drawings, simultaneous reference will be made to FIGS. 1-4 where various views of a clearance-measuring break-away pintle hitch in accordance with an embodiment of the present invention are shown with the pintle hitch being referenced generally by numeral 10. Pintle hitch 10 is to be attached to the aft end, for example, of an amphibious assault vehicle (not shown). However, it is to be understood that pintle hitch 10 can be adapted for use on other types of vehicles without departing from the scope of the present invention.

Pintle hitch 10 includes a mounting post 20, a pintle body 30, a shear pin 40 coupling mounting post 20 and pintle body 30, and a plurality of gauge members 50 coupled to pintle body 30 and shown in their pre-use position. In general, mounting post 20, pintle body 30, and gauge members 50 are all made from rigid and strong materials. However and as will be explained further below, shear pin 40 is made from a material (e.g., a variety of plastics, metal, composites, wood, etc.) that is strong enough to support the coupling of mounting post 20 to pintle-body 30, yet will fail/break when pintle body 30 is subjected to a predefined amount of force such that pintle body 30 separates from mounting post 20.

Mounting post 20 has a threaded end 21 that is to be fed through a mounting hole of a vehicle (not shown). When such a mounting hole must be sealed against moisture intrusion, a gland seal 22 can be provided about mounting post 20 adjacent to threaded end 21. Opposing threaded end 21 along a longitudinal axis 23 of mounting post 20 is a pintle-mount end 24 that is aligned with and coupled to an inboard end 31 of pintle body 30. For reasons that will be explained further below, pintle-mount end 24 includes two bearing surfaces 25 that bear against pintle body 30 when mounting post 20 is coupled to pintle body 30 by shear pin 40. Pintle-mount end 24 has a hole 26 passing through it for receiving shear pin 40.

Pintle body 30 defines the attachment point for a tow hook (not shown). The particular size/shape of pintle body 30 is not a limitation of the present invention. As mentioned above, inboard end 31 is aligned with pintle-mount end 24 with the two then being coupled together by shear pin 40. More specifically, inboard end 31 includes a slot 32 that receives pintle-mount end 24. Transverse to slot 32 is a hole 33 on either side of slot 32. Hole 33 and hole 26 are aligned such that shear pin 40 can extend through them, thereby coupling mounting post 20 to pintle body 30. In this coupled position, bearing surfaces 25 bear against pintle body 30. Shear pin 40 is configured to fail/break if pintle body 30 receives a predefined amount of a force F that acts on pintle body 30 such that pintle body 30 attempts to rotate about shear pin 40 and relative to mounting post 20. However, such rotation is not possible owing to the interface of bearing surfaces 25 against pintle body 30. Note that force F will generally be applied to the lower most portion of pintle body 30 as it is this portion of pintle body 30 that will contact an inclined ramp when pintle hitch 10 is attached to a vehicle traversing such an inclined ramp.

The outboard end 34 of pintle body 30 defines the attachment point for gauge members 50. Each of gauge members 50 is made from a rigid material (e.g., metal) and has a unique length. For example, in the illustrated embodiment, twelve gauge members 50-1 through 50-12 are provided. More or fewer gauge members can be provided without departing from the scope of the present invention. The shape/size of gauge members can be elongate plates (as shown), cylindrical or other geometrically-shaped rods, etc., the choice of which is not a limitation of the present invention. In general, gauge members 50 are pivotally coupled to outboard end 34 along a common axis 51 such that each of gauge members 50 can rotate independently about common axis 51. The above-noted unique length of each gauge member 50 is measured from common axis 51 to the outboard end of each gauge member. Since movement of pintle hitch 10 attached to a vehicle will generally be aligned with longitudinal axis 23 of mounting post 20, common axis 51 is generally perpendicular to longitudinal axis 23. As will be explained further below, the length of each gauge member 50 is indicative of a clearance measurement between pintle body 30 and a ramp for a particular ramp angle.

The independent rotation of each gauge member 50 about common axis 51 can be accomplished in a variety of ways without departing from the scope of the present invention. By way of an illustrative example, a plurality of fixed and spaced-apart mounting plates 52 can be fixedly coupled to pintle body 30 by a bolt 53. Interleaved with mounting plates 52 are gauge members 50 that are pivotally coupled to plates 52 by a bolt 54. Plastic spring washers 55 can be provided at each plate-to-gauge member interface to facilitate rotation of gauge members 50.

In use, gauge members 50 are aligned with one another. Typically, the pre-use alignment of gauge members 50 is parallel to longitudinal axis 23 of mounting post 20 as this orientation will generally be parallel to a flat ground surface when pintle hitch 10 is attached to a vehicle. However, when pintle hitch 10 is traversing a ramp that is at an acute angle relative to longitudinal axis 23, one or more of gauge members 50 will rotate if they come into contact with the ramp. The number of gauge members 50 that rotate is dependent on the ramp angle. That is, at zero or very small ramp angles, no gauge members 50 rotate out of position thereby indicating no clearance issues for the pintle hitch. However, as the ramp angle increases, the longest one of gauge members 50 (i.e., gauge member 50-1) and then one or more of gauge members 50 successively (based on their length) encounter the ramp and are thereby caused to rotate about common axis 51. The shortest one of gauge members 50 that rotates from its pre-use position is indicative of the clearance at that particular ramp angle. If the ramp angle is steep enough, all gauge members 50 will rotate and the above-described force F will cause shear pin 40 to break such that pintle body 30 separates from mounting post 20. In this way, the integrity of the vehicle (to which the pintle hitch is mounted) is maintained. The present invention can also be used during at-sea launch scenarios that drop an amphibious vehicle off the end of a ramp into the water as soon as the vehicle's tracks clear the ramp.

The advantages of the present invention are numerous. The pintle hitch will allow ramp deployment angles to be evaluated with respect to clearance measurements without risking any damage to a vehicle on which the pintle hitch is mounted. The number and length of gauge members can be readily changed to adapt to a variety of installation and/or deployment applications.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A clearance-measuring break-away pintle hitch, comprising:
   a mount having a first end adapted to be coupled to a vehicle, said mount having a second end;
   a pintle body having a portion thereof aligned with said second end of said mount;
   a shear pin coupling said portion of said pintle body to said second end of said mount, wherein said shear pin is configured to break when said pintle body is subjected to a predefined amount of force wherein said pintle body is uncoupled from said second end of said mount; and
   a plurality of gauge members pivotally coupled along a common axis of rotation to said pintle body, each of said gauge members being rigid and having a unique length measured from said common axis of rotation, each of said gauge members independently rotatable about said common axis of rotation.

2. A clearance-measuring break-away pintle hitch as in claim 1, further comprising a gland seal disposed about said mount adjacent to said first end thereof.

3. A clearance-measuring break-away pintle hitch as in claim 1, wherein said shear pin comprises a plastic material.

4. A clearance-measuring break-away pintle hitch as in claim 1, wherein each of said gauge members comprises an elongated plate.

5. A clearance-measuring break-away pintle hitch as in claim 1, wherein said mount has a longitudinal axis extending from said first end to said second end, and wherein said common axis of rotation is perpendicular to said longitudinal axis.

6. A clearance-measuring break-away pintle hitch, comprising:
   a mount having a first end adapted to be coupled to a vehicle, said mount having a second end located a distance from said first end outside of the vehicle;
   a pintle body having an inboard end and an outboard end, said inboard end being aligned with said second end of said mount;
   a shear pin coupling said inboard end of said pintle body to said second end of said mount, wherein said shear pin is configured to break when said pintle body is subjected to a predefined amount of force wherein said pintle body is uncoupled from said second end of said mount; and
   a plurality of gauge members pivotally coupled along a common axis of rotation to said outboard end of said pintle body, each of said gauge members being rigid and having a unique length measured from said common axis of rotation to a respective free end thereof, each of said gauge members independently rotatable about said common axis of rotation.

7. A clearance-measuring break-away pintle hitch as in claim 6, further comprising a gland seal disposed about said mount adjacent to said first end thereof.

8. A clearance-measuring break-away pintle hitch as in claim 6, wherein said shear pin comprises a plastic material.

9. A clearance-measuring break-away pintle hitch as in claim 6, wherein each of said gauge members comprises an elongated plate.

10. A clearance-measuring break-away pintle hitch as in claim 6, wherein said mount has a longitudinal axis extending from said first end to said second end, and wherein said common axis of rotation is perpendicular to said longitudinal axis.

11. A clearance-measuring break-away pintle hitch, comprising:
- a mount having a first end adapted to be coupled to a vehicle, said mount having a second end;
- a pintle body having a portion thereof aligned with said second end of said mount;
- a shear pin coupling said portion of said pintle body to said second end of said mount, wherein said shear pin is configured to break when said pintle body is subjected to a predefined amount of force wherein said pintle body is uncoupled from said second end of said mount;
- a plurality of spaced-apart mounting plates fixedly coupled to said pintle body; and
- a plurality of gauge members interleaved with said mounting plates and pivotally coupled along a common axis of rotation to said mounting plates, each of said gauge members being rigid and having a unique length measured from said common axis of rotation, each of said gauge members independently rotatable about said common axis of rotation.

12. A clearance-measuring break-away pintle hitch as in claim 11, further comprising a gland seal disposed about said mount adjacent to said first end thereof.

13. A clearance-measuring break-away pintle hitch as in claim 11, wherein said shear pin comprises a plastic material.

14. A clearance-measuring break-away pintle hitch as in claim 11, wherein each of said gauge members comprises an elongated plate.

15. A clearance-measuring break-away pintle hitch as in claim 11, wherein said mount has a longitudinal axis extending from said first end to said second end, and wherein said common axis of rotation is perpendicular to said longitudinal axis.

* * * * *